US006326097B1

(12) United States Patent
Hockaday

(10) Patent No.: US 6,326,097 B1
(45) Date of Patent: Dec. 4, 2001

(54) MICRO-FUEL CELL POWER DEVICES

(75) Inventor: Robert G. Hockaday, Los Alamos, NM (US)

(73) Assignee: Manhattan Scientifics, Inc., Los Alamos, NM (US)

( * ) Notice: Subject to any disclaimer, the term of this patent is extended or adjusted under 35 U.S.C. 154(b) by 0 days.

(21) Appl. No.: 09/208,745

(22) Filed: Dec. 10, 1998

(51) Int. Cl.[7] .................................................. H01M 2/00
(52) U.S. Cl. .............................. 429/34; 429/26; 429/127; 427/115
(58) Field of Search .................................. 429/34, 30, 37, 429/91, 38, 39, 26, 127, 27; 427/115, 105

(56) References Cited

U.S. PATENT DOCUMENTS

| 4,138,510 | 2/1979 | Koziol et al. . |
| 4,243,508 | 1/1981 | Dankese . |

(List continued on next page.)

FOREIGN PATENT DOCUMENTS

| 0 239 169 | 9/1987 | (EP) . |
| 874283 | 8/1961 | (GB) . |
| 2139110 | 11/1984 | (GB) . |
| 2268619 | 1/1994 | (GB) . |
| 60-33284 | 2/1985 | (JP) . |

OTHER PUBLICATIONS

Cong Pu et al., "A Methanol Impermeable Proton Conducting Electrlyte System," J. Electrochem. Soc., vol. 142, No. 7, Jul. 1995.
Pyun et al., "Investigation of the Hydrogen Evolution Reaction at a 10wt% Palladium–Dispersed Carbone Electrode Using Electrochemical Impedance Spectroscopy," J. App. Electrochemistry, pp. 953–58, 1996.
P. Hasler & T Allmendinger, "A Novel Pd–Ag Membrane Anode for Alkaline Fuel Cells Suitable for $CO_2$–Containing Hydrogen," J. Power Sources, pp. 93–103, 1993.
L. Blomen & M. Mugerwa, "Fuel Cell Systems," Plenum Press, New York and London, pp. 68–69, 1993.
V. Bloomfield, J. Kelland and D. Bloomfield, "Fuel Cells for Space Marine and Defense Applications," 1992 Fuel Cells Seminar, Tucson, Arizona, pp. 387–390, Nov. 29–Dec. 2, 1992.
C. Derouin, T. Springer, F. Uribe, J. Valerio, M. Wilson, T. Zawodzinski, and S. Gottesfeld, "Recent Achievements in Polymer Electrolyte Fuel Cell R&D," 1992 Fuel Cells Seminar, Tucson, Arizona pp. 615–618, Nov. 29–Dec. 2, 1992.

(List continued on next page.)

Primary Examiner—Stephen Kalafut
Assistant Examiner—Raymond Alejandro
(74) Attorney, Agent, or Firm—James Creighton Wray; Meera P. Narasimhan

(57) ABSTRACT

Coupling miniature liquid fueled fuel cells with portable electrical devices, with or without rechargeable batteries, lead to new appliance configurations: charging holster, piggyback charger, fuel cell integral with rechargeable battery, fuel cell with voltage regulating electronics, supplying fuel through a tube with a valve or pump, and supplying power though an electric cable between the fuel cell and the electronic device and the fuel cell power pack having independent communication and functions from the portable electrical devices. In all of these configurations there may be a window showing the fuel level of a disposable fuel ampoule or refillable fuel tank. Fuel is distributed through disposable fuel ampoules in blister packages, or refueling bottles. Adjustable moisture and thermal internal insulation allows fuel cells to run at elevated temperatures. These design features permit greater performance, workability, and convenience to the user of these portable electronics. Additionally, these MICRO-FUEL CELL arrays, which pack more energy into a small space, may be mass produced on a plastic film in a reel-to-reel process.

32 Claims, 11 Drawing Sheets

U.S. PATENT DOCUMENTS

| | | |
|---|---|---|
| 4,252,868 | 2/1981 | Bohm et al. . |
| 4,294,891 * | 10/1981 | Yao et al. ............................ 429/2 |
| 4,421,579 | 12/1983 | Covitch et al. . |
| 4,623,415 | 11/1986 | Kahara et al. . |
| 4,661,423 | 4/1987 | Ueno et al. . |
| 4,666,579 | 5/1987 | Beaver et al. . |
| 4,673,624 | 6/1987 | Hockaday . |
| 4,769,297 | 9/1988 | Reiser et al. . |
| 4,793,910 | 12/1988 | Smotkin et al. . |
| 4,804,449 | 2/1989 | Sweeney . |
| 4,818,637 | 4/1989 | Molter et al. . |
| 4,824,741 | 4/1989 | Kunz . |
| 4,826,554 | 5/1989 | McIntyre . |
| 4,865,925 | 9/1989 | Ludwig et al. . |
| 4,931,168 | 6/1990 | Watanabe et al. . |
| 5,084,144 | 1/1992 | Reddy et al. . |
| 5,108,849 | 4/1992 | Watkins et al. . |
| 5,173,166 | 12/1992 | Tomantschger et al. . |
| 5,187,025 | 2/1993 | Kelland et al. . |
| 5,234,777 | 8/1993 | Wilson . |
| 5,240,786 | 8/1993 | Ong et al. . |
| 5,242,764 | 9/1993 | Dhar . |
| 5,252,410 | 10/1993 | Wilkinson et al. . |
| 5,262,250 | 11/1993 | Watanabe . |
| 5,264,299 | 11/1993 | Krasij et al. . |
| 5,266,421 | 11/1993 | Townsend et al. . |
| 5,290,323 | 3/1994 | Okuyama et al. . |
| 5,316,871 | 5/1994 | Swathirajan et al. . |
| 5,364,711 | 11/1994 | Yamada et al. . |
| 5,432,023 * | 7/1995 | Yamada et al. .................... 429/34 |
| 5,453,331 | 9/1995 | Bloom et al. . |
| 5,472,799 | 12/1995 | Watanabe . |
| 5,482,568 | 1/1996 | Hockaday . |
| 5,631,099 | 5/1997 | Hockaday . |
| 5,641,585 * | 6/1997 | Lessing et al. ..................... 429/26 |
| 5,681,057 * | 10/1997 | Whirley et al. .................... 280/784 |
| 5,759,712 | 6/1998 | Hockaday . |

OTHER PUBLICATIONS

Y. Fang and J. Leddy, "Surface Diffusion in Microstructured, Ion–Exchange Matrices: Nafion/Nuetron Track–Etched Polycarbonate Membrane Composites," Journal of Physical Chemistry, vol. 99, pp. 6064–6073 1995.

B. Gupta and G. Scherer, "Proton Exchange Membranes by Radiation Induced Graft Copolymerization into Teflon FEP Films," Chimia 48, pp. 127–137, 1994.

S. Narayanan, E. Vomos, H. Frank, S. Surampudi and G. Halpert, "Electrochemical Characterizations of Carbon–Supported Pt, Pt–Sn, Pt–Ru Electrodes and the Oxidation of Methanol and Formaldehyde," 1992 Fuel Cell Seminar, Tucson, AZ, Nov. 29–Dec.2, 1992, pp. 233–236.

M. Riezenman, "The Search for Better Batteries," IEEE Spectrum, pp. 51–56, May 1995.

M. Rota, H.P. Brack, F.N. Buechi, B. Gupta, O. Haas and G.C. Scherer, "Membrane Development of PEFC at PSI," Abstracts of Papers, 187th Meeting of The Electrochemical Society, Reno, NV, 1995.

S. Surampudi, S.R. Narayanan, E. Vamos, H. Frank, G. Halpert, A. LaConti, J. Kosek, G.K. Surya Prakash and G.A. Olah, "Advances in Direct Oxidation Methanol Fuel Cells," Space Electrochemical Research and Technology Proceedings, NASA Lewis Research Center, Cleveland, OH, Apr. 14–15, pp. 181–191, 1993.

W. Vielstich, translated by D. Ives, "Fuel Cells," Wiley–Interscience, London, New York, Sydney, Toronto, 1970.

W. Vielstich, A. Kuver, M. Krausa, A. Cesar Ferreira, K. Petrov, and S. Srinivasan, "Proton Exchange Membrane Fuel Cells Using Gas–Fed Methanol," Symposium on Batteries and Fuel Cells for Stationary and Electric Vehicle Applications, Honolulu, HI, pp. 268–280, 1993.

Abbott et al., "Manipulation of the Wettability of Surfaces on the 0.1 to 1 Micrometer Scale Through Micromachining and Molecular Self–Assembly," Science, vol. 257, pp. 1380–1382, Sep. 4, 1992.

J.S Batzold, "Thin Film Fuel Cell Electrodes," in *From Electrocatalysts to Fuel Cells*, ed. By G. Sandstede (University of Washington Press, Seattle), pp. 224–229, Jun. 8, 1972.

Boris Daniel Cahan, "The Mechanism of Electrodic Reactions of Porous Surfaces," Ph.D. Dissertation, University of Pennsylvania, 1968.

Robert Hockaday, "Development and Modeling of the Homoporous Electrode Fuel Cell," Masters Thesis, New Mexico State University, Dec., 1984.

J. Joyce and J. Leddy, "Composite Ion Exchange Membranes: Microstructure and Mass Transport," abstract of an oral presentation, Journal of Electrochemical Society, vol. 135, No. 3, p. 139 C, Mar., 1988.

P.D. Naylor et al., "A Novel Anode System for Direct Methanol Fuel Cell," 1992 Fuel Cell Seminar, Tucson, AZ Nov. 19–Dec. 2, 1992, pp. 575–578.

S. Sarangapani et al., "Advanced Corrosion–Resistant Coatings for Fuel Cell Applications," 1992 Fuel Cell Seminar, Tucson, AZ Nov. 29–Dec. 2, 1992, pp. 167–170.

S.H. Srinivasan et al., "Fundamental Equations of Electrochemical Kinetics at Porous Gas–Diffusion Electrodes," The Journal of Chemical Physics, vol. 46, No. 8, Apr. 15, 1967, pp. 3108–3122.

* cited by examiner

MICRO-FUEL CELL POWER DEVICES

BACKGROUND OF THE INVENTION

The present invention relates generally to fuel cell devices, and more specifically to the manufacturing process for MICRO-FUEL CELL™ power devices and to their application configurations.

A number of miniature fuel cells suitable for use with portable electronic products are becoming available today, but less attention has been shown to the low-cost mass production and device packaging of these fuel cells for varied applications. There is limited information in the literature concerning such things as the coupling of these miniature cells to the various applications, methods for refueling the cells in a low-cost and efficient manner, or any type of thermal insulation to elevate the temperature of the cell for higher efficiency in various environmental conditions. Another problem with portable electronic appliances is that they need to be kept in a ready position that is secure but easily accessible when needed. For example, cellular phone holsters may use clips and gravity securing devices to keep the phone from dropping when jostled. Another problem with portable electronics is that they can easily be misplaced.

Representative prior inventions of this general type include U.S. Pat. Nos. 5,364,711 and 5,432,023, which describe miniature fuel cells that run on methanol and are used to run electronics, and U.S. Pat. Nos. 4,673,624 ("Fuel Cell") and 5,631,099 ("Surface Replica Fuel Cell"), which describe methods of forming fuel cells. None of those patents describe how to package the fuel cell to efficiently run the electronics applications. U.S. Pat. No. 5,759,712 ("Surface Replica Fuel Cell for Micro Fuel Cell Electrical Power Pack") describes how a fuel cell can be packaged in a general hybrid systems power pack which may be comprised of a fuel cell and other energy sources, such as a battery, flywheel, or solar cells. It mentions cellular phones in particular, but does not appear to describe the coupling configurations or refueling systems for these electrical applications. In this application, the porous gas manifolds and air gaps in the case of the power packs acts as both insulation and water control mechanism. None of those patents mentioned using exchangeable insulation to compensate for different environmental temperature conditions. However, none of those patents discloses or suggests the novel features of the present invention.

SUMMARY OF THE INVENTION

The present invention applies the fuel cells described in this inventor's U.S. Pat. Nos., 4,673,624, 5,631,099, and 5,759,712, to numerous electrical devices. Examples of devices that realize a significant advantage from such power systems include, but are not limited to, portable electronics and power tools; such as cellular phones, pagers, video camcorders, portable tools, portable PCs, portable toilets, smoke detectors, hearing aids, portable stereos, portable TVs, portable radios, night vision goggles, portable lighting, toys, computer peripherals, and portable vacuum cleaners.

The critical component in this invention is a fuel cell that is formed on a plastic sheet, including a number of fuel cells described in "Surface Replica Fuel Cell", U.S. Pat. No. 5,631,099, U.S. Pat. No. 4,673,624, and U.S. Pat. No. 5,759,712. These fuel cells pack more energy in a smaller space than conventional rechargeable batteries by utilizing liquid methanol and water fuel. The methanol fuel has effectively 5 to 13 Whr per cubic inch (20% to 50% efficiency) energy density. This is 3 to 9 times the energy density of today's best nickel cadmium batteries, and 40 to 120 times that of standard cellular phone battery packs. These micro-fuel cells are lighter than conventional rechargeable batteries. The methanol fuel has effectively 1200 to 3000 Whr per kg energy per unit mass (20% to 50% efficiency). This is 2 to 5 times the 600 Whr per kg quoted for the latest rechargeable lithium ion batteries (Science News, Mar. 25, 1995).

Our first micro-fuel cell is designed to replace the standard cellular phone battery packs. Conventional cell phones usually have a warning alert signal when the battery is low, but the accuracy and dependability of these indicators often leave much room for improvement. Determining the remaining energy capacity from a rechargeable battery typically uses the voltage output level as an indicator of charge but does not measure the capacity. Therefore, history of the discharge is used to assess the future of the remaining output. This electronic assessment of remaining energy capacity is complex, requires diagnostic electronics and is prone to errors. The liquid fueled fuel cell eliminates this uncertainty. Checking the fuel supply is as simple as looking at the liquid level in the fuel tank. The amount of fuel remaining compared to the total fuel tank capacity is the fraction of the total energy. Refueling also provides instant recovery. Components of these micro-fuel cells are inexpensive. Manufacturing and assembly cost are low. The production techniques allow the fuel-cells and power supply systems to be manufactured at costs similar to rechargeable batteries. The production techniques enable the fuel cells to be produced in a roll-to-roll manufacturing method, similar to printing press processes. The production is envisioned as taking place in a vacuum system in which the metal electrodes and catalysts are deposited onto a reeled plastic web. The electrolytes may also be deposited by means of a reeled vacuum deposition system or dip tank. The individual fuel cell devices would be cut off the rolls of fuel cells and assembled. The edge seals are expected to be heat seals, with the cutting operation and heat seal operation envisioned as one and the same. The MICRO-FUEL CELL is the "green" (environmentally clean) solution to energy needs. It is never thrown away, but rather refueled with common ethanol or methanol, an abundant and renewable energy source. The production process and the disposal of manufacturing by-products do not present toxic waste problems. The plastic fuel tanks when empty can be disposed of as common food packaging.

One aspect of this invention addresses the fact that small portable fuel cells encounter a range of exterior environmental temperature and humidity. To compensate for this range and to optimize the performance of the fuel cells an adjustable moisture and thermal internal insulation barrier is used to allow fuel cells to run at elevated temperatures.

Current appliances that run on rechargeable batteries are recharged by "plugging in" to alternating current sources or DC electrical systems, such as found in a car or other vehicle. This source of energy may be inconvenient or unavailable for many users in remote locations. The present invention allows the fuel cell energy system of an appliance, the fuel cell itself, and the fuel supply packaging to all fit together in a convenient manner.

These and further and other objects and features of the invention are apparent in the disclosure, which includes the above and ongoing written specification, with the claims and the drawings.

DETAILED DESCRIPTION OF THE PREFERRED EMBODIMENTS

Figure 1A:
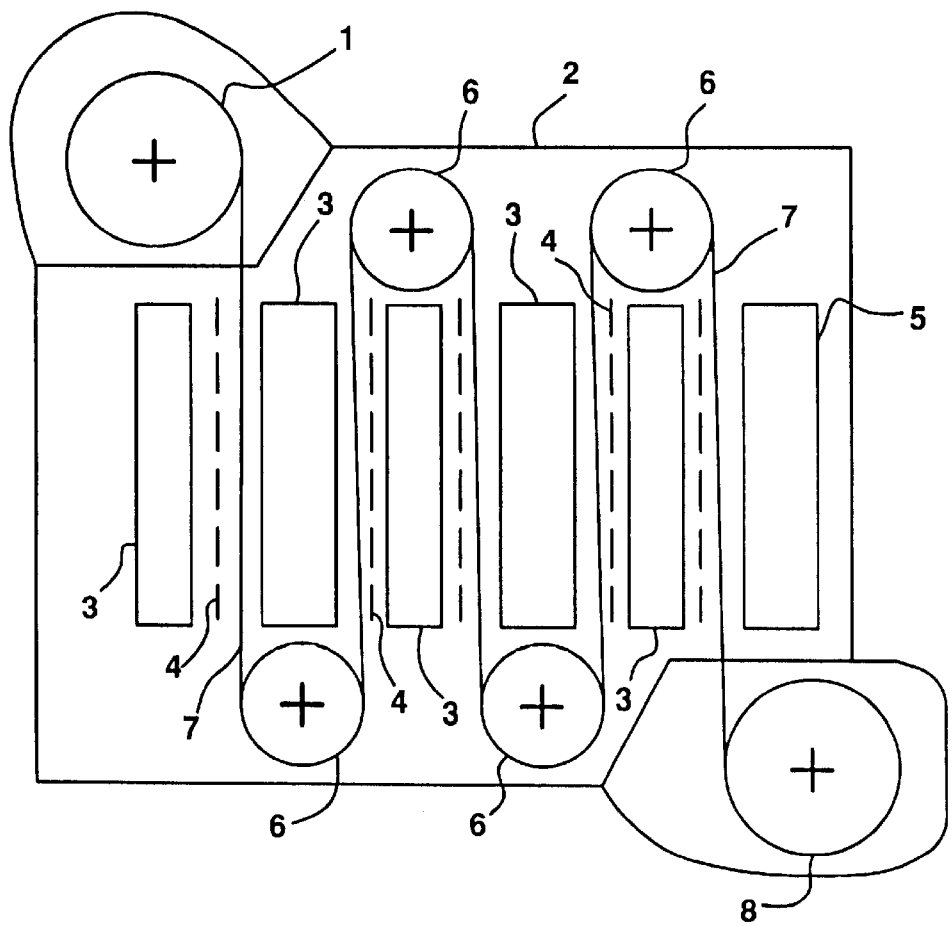
FIG. 1A is a schematic representation of the reel-to-reel web coating production process for the micro-fuel cells of this invention.

FIG. 1A shows a preferred embodiment of the production process for the MICRO-FUEL CELL of the present invention. The production line starts with a porous plastic substrate manufactured, as described in U.S. Pat. No. 5,631,099, in which the plastic is irradiated and etched to produce patterned porous plastic films. Alternatively manufactured porous plastic films may be used where selective areas of pores are filled to produce non-conductive regions in the MICRO-FUEL CELL arrays. The porous plastic web 7 is rolled onto a source reel 1 (spool) and inserted into the web coating vacuum chamber 2. Several loading schemes are available. The plastic web 7 may be reeled into the vacuum chamber 2 though a differential pumped seal, inserted through a load lock, or inserted into the coating chamber in an air environment and then evacuated. The plastic web 7 is reeled past the sputter sources and evaporation sources (guns) 3, as shown, where deposition patterns are deposited in any one of a variety of ways, as follows:

i) the first scheme, shown here, is to sputter through proximity sputter masks 4;

ii) the second scheme is to raster an atomic beam of the deposit material; or iii) the third way is to use self masking patterns on the porous plastic substrate and a deposition source which has angle of incidence and collimation control.

An analogous system of deposition in air or liquid includes spray painting, ink jet printing, proximity electroplating, Xerography, photolithography, chemical vapor deposition and auto electroplating, which all may be used in a reeled web system, under vacuum, controlled atmosphere, or in air as appropriate to the deposition requirements. All these deposition techniques are mentioned in U.S. Pat. No. 5,759,712. In the vacuum deposition system, a variety of sputter sources 3 and heat sinks 5 may be arranged parallel to the porous plastic web 7. The production output rate of this sputter system is critically dependent upon the maximum temperature at which the materials are deposited onto the plastic substrate, and the rate at which heat is removed by means of strategically placed heat sinks 5. The heat removal from the plastic substrate in the vacuum system is proportional to the forth power of the absolute temperature and it's emissivity. The sputter sources 3 remove all excess heat transfer to the plastic substrates, but the essential heat input will come from the heat of condensation of the deposit material. Thus, the heat input to the plastic substrate is essentially proportional to the rate at which material is deposited. The deposition dwell time for a coating is proportional to the thickness of the film and the material condensation enthalpy divided by the desired substrate temperature to the forth power. The porous plastic web 7 may be moved into position using encoded motors on the position rollers 6. The fundamental motions are to:

i) advance the plastic film;

ii) fine adjust the position; and then iii) dwell for the deposit.

The positioning of the plastic web is coordinated through optical sensors to marks on the porous plastic or to the first deposit pattern. Slack in the plastic film between sputter deposits can be compensated for by translator controlled take-up reels. The first step in the material deposit is an oxygen ion milling of the surface of the plastic. Surface texturing may also take place in this step. Examples of material deposited in order are:

For the fuel side of membrane:

i) high pressure sputter Pt/Ru to form porous deposits;

ii) low pressure sputtered Pd; and iii) high pressure sputtered Pt/Ru.

For the air side of the membrane:

iv) low pressure Au; and v) high pressure Pt/Ru.

Thus, in this example, five sputter guns 3 and deposits would be used to deposit the electrodes. The porous plastic web 7 is taken up on a take-up reel 8 which is aft of the sputter guns 3. The plastic film 7 may exit from the sputter chamber 2 by any one of the methods as previously mentioned to insert the plastic film.

Figure 1B:
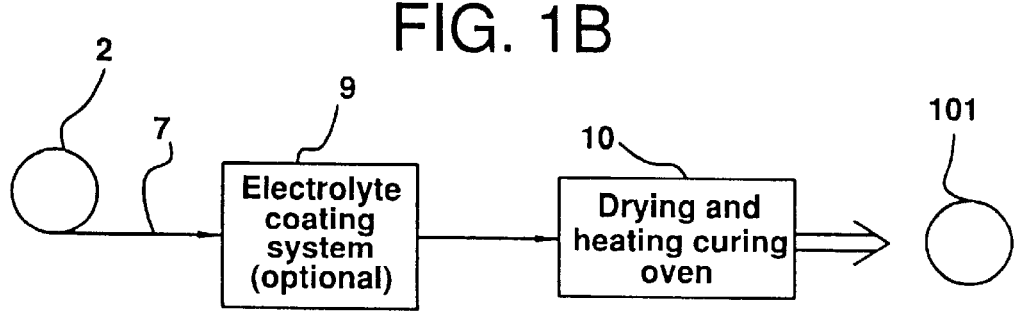
FIG. 1B is a flow chart of the back-end production process for the micro-fuel cells of this invention.

FIG. 1B shows the back-end process for manufacturing the MICRO-FUEL CELLS. From the coating chamber 2, the plastic film 7 is loaded into an electrolyte coating system 9 (unless the electrolyte was already deposited in the vacuum chamber since some electrolytes can be deposited in vacuum.) The plastic web 7 is next reeled through an electrolyte solution, such as 5% Nafion® solution (perfluorinated ion exchange polymer alcohol solution made by Solution Technology Inc, PO Box 171 Mendenhall, Pa. 19357), and then is drawn up though a drying and heat curing oven 10 to provide the finished plastic web 101. Finally, the plastic web is then assembled with the gas manifolds, as in U.S. Pat. No. 5,759,712. The gas manifolds and a diffusion membrane or a second fuel cell array sub-assembly may be assembled and heat sealed, ultrasonic welded, or glued around the rim in place on the plastic web. These assembled MICRO-FUEL CELL arrays are then reeled onto spools which can be shipped to separate locations or cut out of the plastic web immediately. Laser cutting, shear cutting or die cutting are used to slice out the fuel cell arrays from the plastic web. The cutout fuel cell arrays are placed in the fuel cell assemblies as described in U.S. Pat. No. 5,759,712 and the remainder of this patent. The fuel cell power supply assemblies then undergo an electronic performance check after they are assembled.

Figure 2:
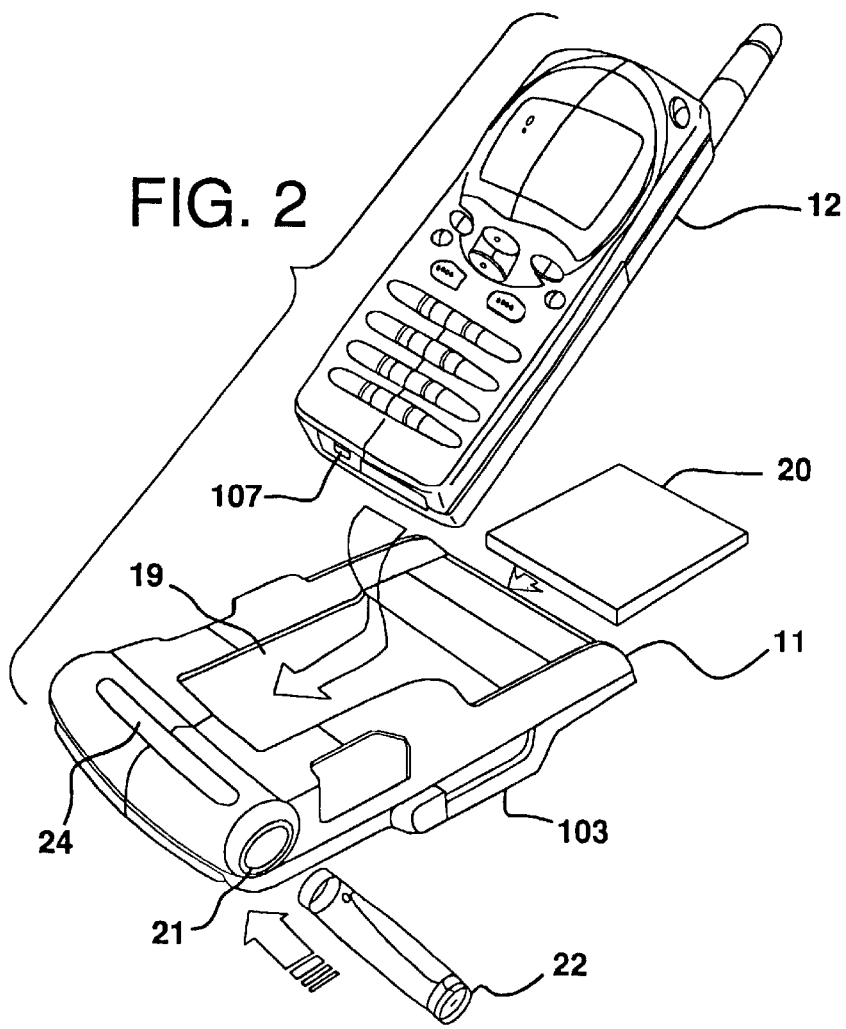
FIG. 2 is a perspective view of the cellular phone power holster of this invention.

FIG. 2 shows a power holster 11 that is formed with a polycarbonate plastic housing to fit snugly around a cellular phone 12. The cellular phone 12 needs to fit such as to maintain positive pressure between its electrical contacts and those in the power holster through gravity and the vertical mounting of the cellular phone. Alternatives to using gravity pressure is to have the phone press against electrical spring contacts 13 or to snap-in with a ratchet mechanism 14, as shown in FIGS. 4A, 4B, 4C and 4D. The ratchet 14 is released by applying pressure simultaneously to the finger buttons 15, located in the ratchet holes 16 on each side of the fuel cell holster 11.

Alternatively, the mechanism's ratchet teeth 18 may be designed with a slope on both sides, so that the phone is removable from the holster by means of a firm pull. Velcro attached at the bottom of the holster is another securing mechanism working with the springy electrical contacts 13. To provide a means of attaching the power holster to clothing, a clip 103 may be formed in the power holster plastic housing 11. An alternative is to form a belt loop to permit a belt or purse strap to be threaded through.

Figure 3A:
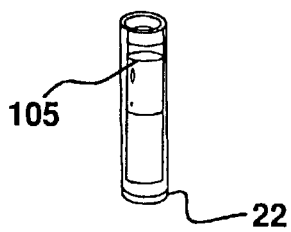
FIGS. 3A and 3B are perspective views of a fuel tank and a blister pack of fuel tanks.
Figure 3B:
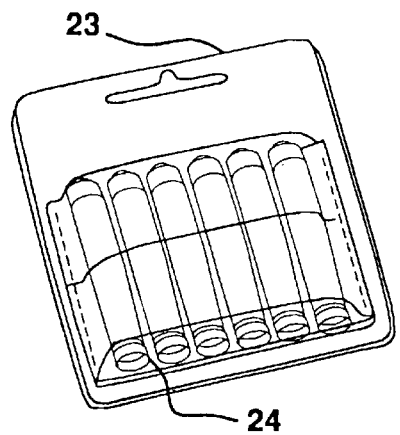
Figure 4A:
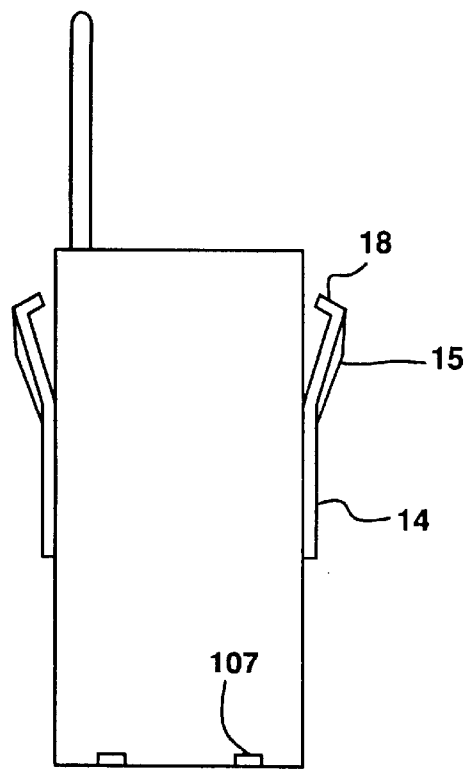
FIGS. 4A and 4B are front and side elevations of a cellular phone with a ratchet mechanism.
Figure 4B:
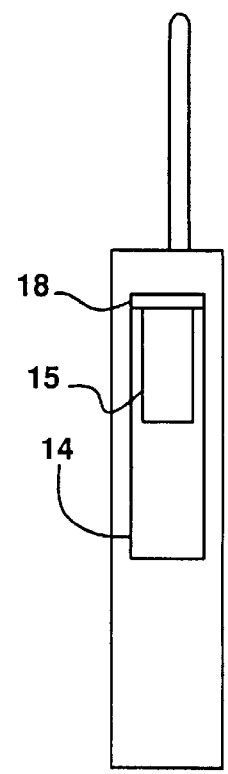
Figure 4C:
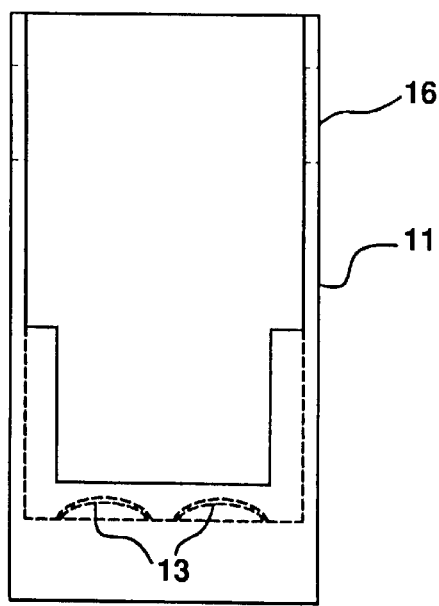
FIGS. 4C and 4D are front and side elevations of a holster for receiving a cellular phone with a ratchet mechanism.
Figure 4D:
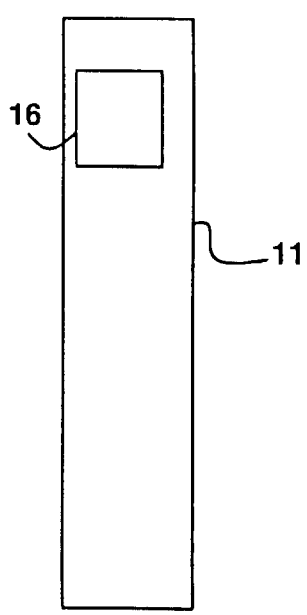

Referring back to FIG. 2, the MICRO-FUEL CELL array 19 is placed along the length of the polycarbonate plastics housing 11. A gas diffusion mat 20, made from polyester fiber paper to serve as a protective cover, is placed over the MICRO-FUEL CELL array 19. The gas diffusion mat 20 also serves as a thermal insulation layer. In cold environments it may be made thicker and in hot environments it may be thinner to maintain an optimum elevated operating temperature of the fuel cell array 19. The power holster 11 has a fuel cavity 21 designed to accept the fuel tanks 22, shown in FIG. 3A. The fuel tanks 22 are made from polyethylene plastic and filled with 1:1 molecular ratio of methanol to water mixture. The fuel tanks 22 are inserted into the fuel cavity 21 and are impaled on the fueling needle (not shown) to start fueling. The fuel is then wicked from the needle to the MICRO-FUEL CELL fuel manifold. The fuel tanks 22 may be sold in blister packages 23, as shown in FIG. 3B. To allow observation of the fuel level 105 in the fuel tank 22 while mounted in the power holster 11, a window 24 is included in the plastic housing over the fuel tank. Other methods of measuring fuel level include:
  i) a weight monitoring system correlated to fuel quantity based on the fact that the device will get lighter as the fuel is depleted is a viable alternative;
  ii) measuring the electronic capacitance of the fuel tank by placing electrodes in close proximity to the tank;
  iii) adding a chemical colorant that changes color or opacity as the fuel is depleted;
  iv) a fuel immobilizer matrix in the fuel tank, such that when fuel is replaced with gas it's opacity will change; and
  v) in larger systems, a float indicator such as fuel gauge systems in vehicles.

Electric power from the MICRO-FUEL CELL 22 is delivered to the electrical contacts 107 on the cellular phone through two gold coated beryllium copper contact leaf springs 13 that make contact with the MICRO-FUEL CELL 22 through rivet or other electrical connections. Additional electronic functions and features that may be incorporated into the holster 11 include:
  i) a locator device, consisting of a receiver/transmitter being added to the holster so that when the cell phone is misplaced it may be located by means of a directional antenna or by simply stimulating the ringer on the phone;
  ii) a pager feature from the holster to the phone could be added;
  iii) a portable computer that can use the portable phone or electronic device as its communication relay;
  iv) a radio communications relay transmitter for a portable communication device which thereby reduces the weight and mass of the portable communication device; and
  v) such a portable communication device has the potential to be reduced to the size of a wristwatch, two-way hearing aid (bone conduction microphone), credit card or broach, so as to be located in a purse; pocket, attached to the belt, shoes, or inside the body as long as it can receive sufficient oxygen.

Figure 5A:
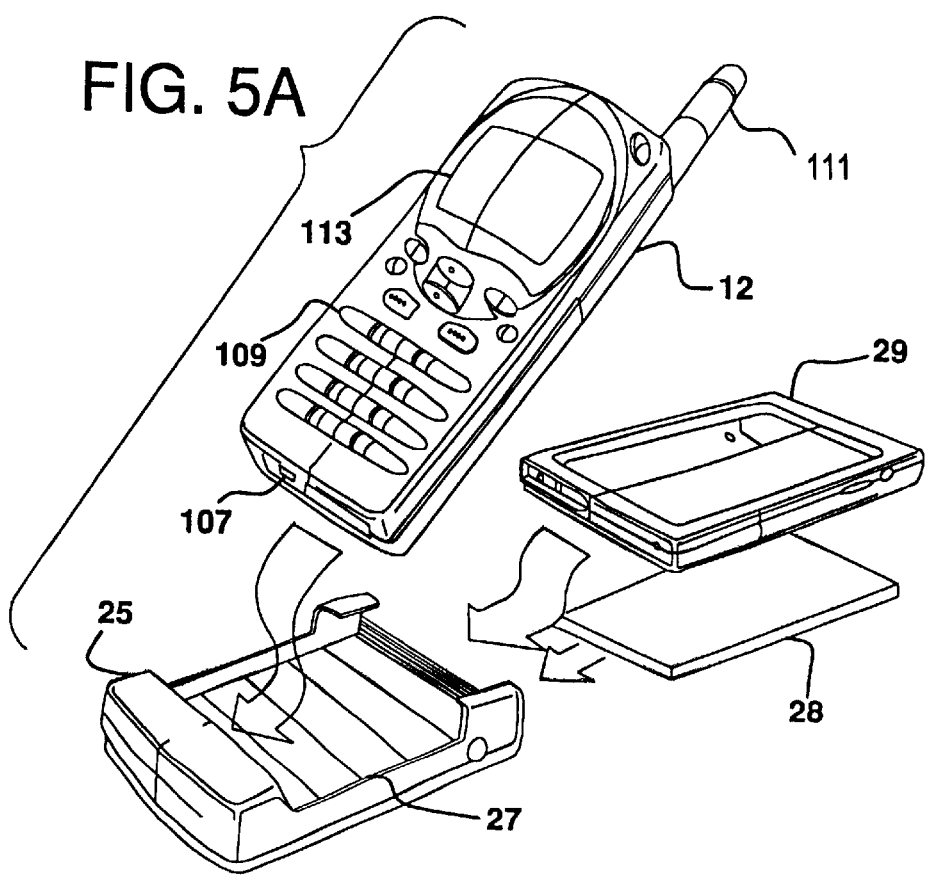
FIGS. 5A and 5B are perspective views of a piggyback charger.
Figure 5B:
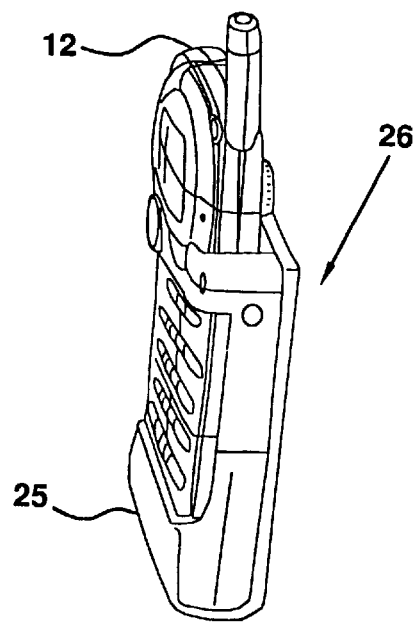

The piggyback charger 26 is formed with a polycarbonate plastic housing 25 to fit snugly and have a positive gripping hold around a cellular phone 12, as shown in FIGS. 5A and 5B. A positive grip on the phone 12 may be accomplished in a number of ways, including:
  i) using Velcro foam backed strips in the well of the plastic housing;
  ii) by rubber ratchets on the inside of the plastic housing and a foam pad in the well of the housing; and
  iii) with ratchets that extend around the end of the phone.

The MICRO-FUEL CELL array 27 is placed along the length of the polycarbonate plastics housing 25, as shown. A gas diffusion mat 28, made from polyester fiber paper to serve as a protective cover, is placed over the MICRO-FUEL CELL array 27. The gas diffusion mat 28 also serves as a thermal insulation layer. In cold environments it may be made thicker and in hot environments it may be made thinner to maintain an optimum elevated operating temperature of the fuel cell array 27. The mat 28 or matrix may be wetted or coated with a wetting agent that causes water to be wicked into the fuel cell 27 to maintain an optimum humidity on the fuel cell. The surface energy or wetting coatings may be varied though the thickness of the matrix to draw water back into the fuel cell 27. One alternative is to use hollow fibers in the matrix and by capillary action draw condensed water into the fuel cell 27. For applications where there is excessive heat and water production, this same wicking system may be used to remove the excessive heat and water. The vaporization of water and liquid return cycle acts as an additional cooling mechanism for the removal of heat. If there is condensed water in the matrix, it increases the thermal conductivity, which reduces the thermal insulating property of the matrix, and raises the outer temperature of the matrix, thereby vaporizing more water to the outside air. The piggyback charger 26 has a fuel cavity designed to accept the low profile sealed fuel tank ampoule 29 between the insulating mat 28 and the cellular phone 12. The fuel tanks 29 are shaped to fit the tank cavity and are made from polyethylene plastic and filled with 1:1 molecular ratio of methanol to water mixture. Other fuel mixtures of methanol and water may be used, as well as other types of alcohols, hydrocarbons and hydrogen bearing compounds. The fuel tanks 29 are inserted into the fuel cavity and are impaled onto the fueling needle to start fueling. The fuel is then wicked from the needle to the MICRO-FUEL CELL fuel manifold. The fuel tanks 29 may be sold individually or in volume packages. To allow observation of the fuel quantity while the tank is in the piggyback charger 26, a transparent window over the fuel tank is included in the plastic housing 25 for direct viewing of the fuel level. The electric power from the fuel cell 27 is delivered to the charging contacts 107 on the cellular phone through two gold coated beryllium copper contact leaf spring contacts (not shown). These contact springs make contact with the MICRO-FUEL CELL 27 through rivet or other electrical connections. The piggyback charger 26 is designed to be carried as an integral part of the phone so as to continuously charge the cell phone's battery. The cell phone 12 is fully functional at all times, even with the piggyback charger 26 in place. The piggyback charger 26 may have an outer porous cover to permit moisture from the fuel cell 27 and the user's hand to evaporate. The porous cover may also enhance the user's grip on the phone and make it more comfortable to use. The piggyback charger 26 does not cover any of the cellular phone function buttons 109, antenna 111, or displays 113.

Figure 6A:
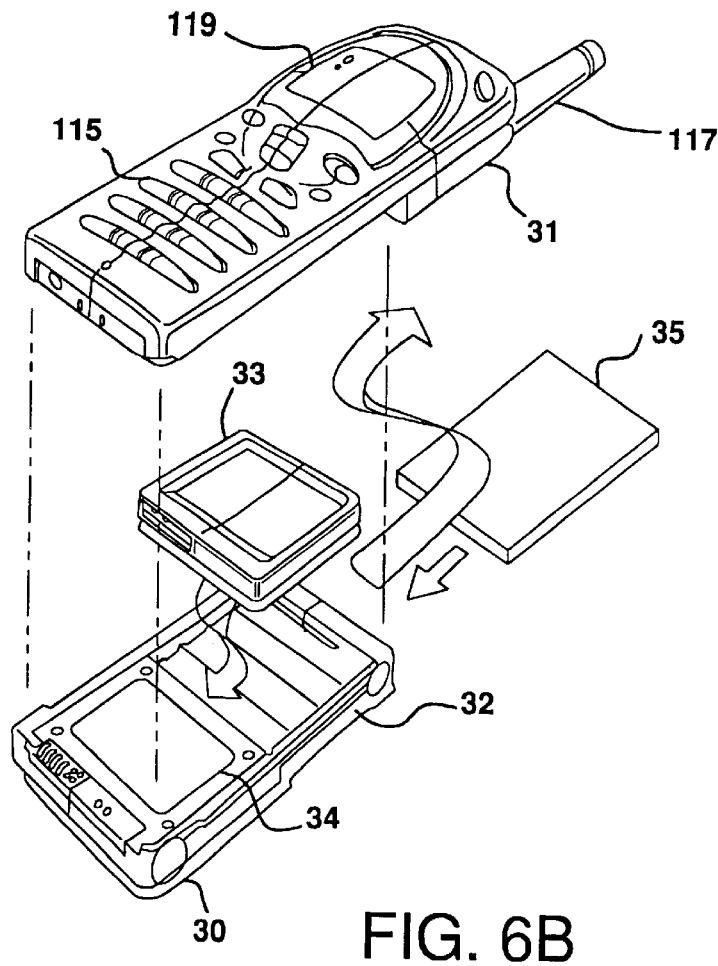
FIGS. 6A and 6B are an exploded view of a trickle charger and a perspective view of a trickle charger.
Figure 6B:
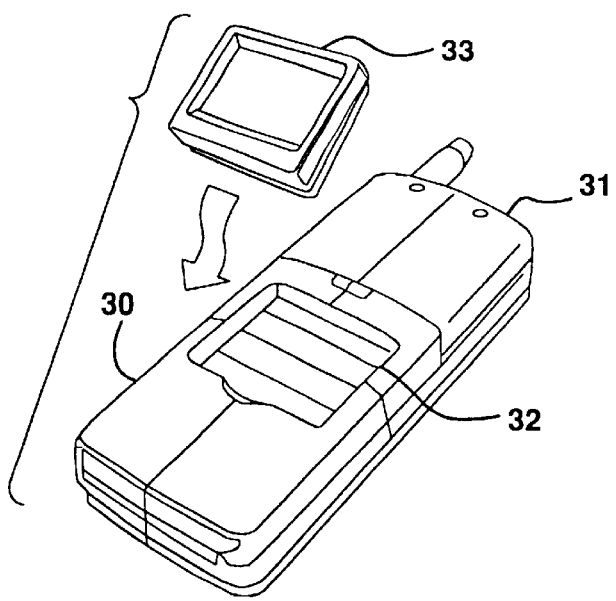

As shown in FIGS. 6A and 6B, the trickle charger 30 is formed with polycarbonate plastic housing to fit in the position designed for batteries in a typical cellular phone 31. The trickle charger 30, which replaces the standard battery pack in a cell phone 31, has four primary components:

i) a fuel cell 32;

ii) a fuel tank 33;

iii) a battery 34 (shown in this example as a lithium battery); and iv) an insulation mat 35.

The MICRO-FUEL CELL array 32 is placed along the length of the polycarbonate plastics housing, as shown, and used to provide a continuous trickle charge to the battery 34. A gas diffusion mat 35, made from a matrix material such as polyester fiber paper to serve as a protective cover, is placed over the MICRO-FUEL CELL array 32. The gas diffusion mat 35 also serves as a thermal insulation layer. In cold environments it may be made thicker and in hot environments it may be made thinner to maintain an optimum elevated operating temperature of the fuel cell array 32. The heat from the fuel cell 32 warms the trickle charger 30 and maintains a higher operating temperature on the battery. For very cold environments the gas diffusion mat insulation 35 covers both the battery 34 and the fuel cell 32 to keep the battery at an elevated temperature from the surroundings. For warm environments the fuel cell 32 may be insulated from the battery 34, and both the battery and fuel cell have minimal insulation to the exterior of the case. A material that is commercially available to do this function is called CoolMax® (made by Bush Associates P.O. Box 3043, Newport, Calif. 92663). To enable the fuel cell 32 to handle a range of temperature conditions the insulation may have a different thickness across each of the fuel cells in the array 32. When the fuel cell array 32 is idling, the well insulated portion of the array is operating at optimum temperature and humidity while the less insulated portion of the fuel cells are cooler and at sub-optimum temperature. When the MICRO-FUEL CELL 32 is under load or in higher environmental temperatures, the insulated portion of the array is dehydrated and sub-optimum and the less insulated portion is at optimum temperature and humidity. The fuel cavity is designed to accept sealed fuel tanks (ampoules) 33 inserted between the cellular phone and the trickle charger 30. In another embodiment, shown in FIG. 6B, the fuel ampoule 33 is snapped into the back of the trickle charger 30 while it is attached to the cellular phone 31. The fuel tanks 33 are shaped to fit the tank cavity and are made from polyethylene plastic and filled with 1:1 molecular ratio of methanol to water mixture. As the fuel tanks 33 are inserted into the fuel cavity they are impaled onto the fueling needle (not shown) to start fueling. The fuel is then wicked from the needle to the MICRO-FUEL CELL fuel manifold. A ratcheting, positive clamping, snap-in, or other containment of the fuel tank 33 is provided between the trickle charger 30 and the fuel tank. The fuel tanks 33 may be distributed individually or in volume quantities. To allow observation of the fuel level in the fuel tank 33 while attached to the trickle charger 30, a transparent window (not shown) over the fuel tank is included in the plastic housing for direct viewing of the fuel level. Electric power from the fuel cell is delivered to the charging contacts on the cellular phone through two gold coated beryllium copper contact leaf spring contacts (not shown). These contact springs make contact with the MICRO-FUEL CELL 32 through rivet or other electrical connections. The trickle charger 30 is carried as an integral part of the phone 31, making the phone fully functional at all times. The trickle charger 30 may have an outer porous cover to permit moisture from the fuel cell 32 and the user's hand to evaporate. The porous cover enhances the user's grip on the phone and makes it more comfortable to use. The trickle charger 30 does not cover any of the cellular phone function buttons 115, antenna 117, or displays 119.

Figure 7A:
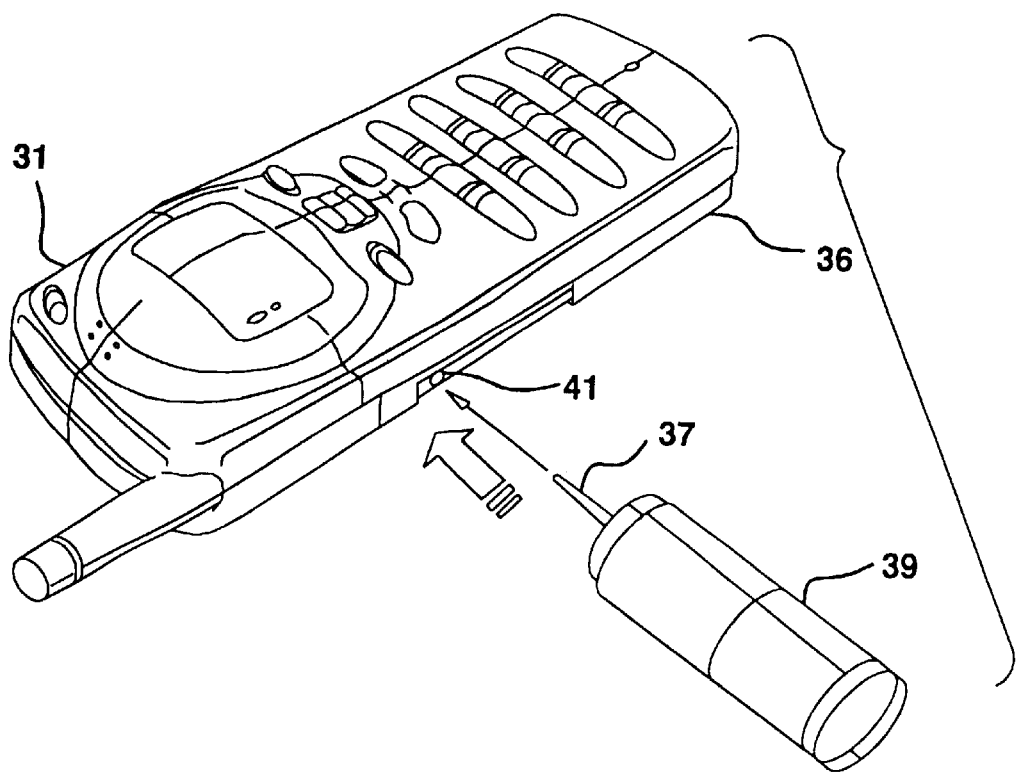
FIGS. 7A and 7B are perspective views of refilling a trickle charger and a refillable trickle charger battery.
Figure 7B:
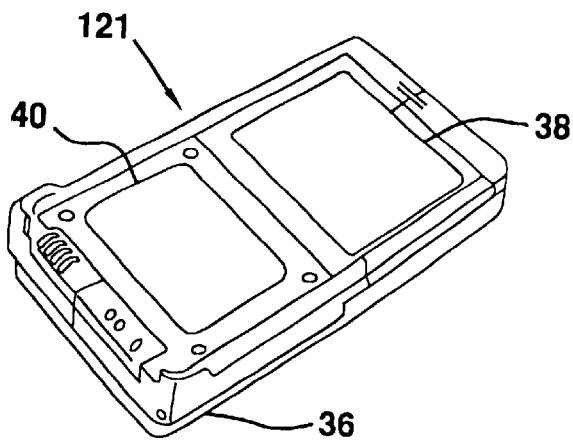

The refillable trickle charger 121, shown in FIGS. 7A and 7B, is formed a with polycarbonate plastic housing 36 to fit in the position designed for batteries in the cellular phone 31. The refillable trickle charger 121 has four primary components:

i) a fuel cell (not shown);

ii) a molded in fuel tank 38;

iii) a refueling tank or dispenser 39; and iv) a battery 40 (shown in this example as a lithium battery).

The MICRO-FUEL CELL array (not shown) is placed along the length of the polycarbonate plastics housing 36. A gas diffusion mat (not shown), made from polyester fiber paper to serve as a protective cover, is placed over the MICRO-FUEL CELL array. The gas diffusion mat also serves also a thermal insulation layer. In cold environments it may be made thicker and in hot environments it may be made thinner to maintain an optimum elevated operating temperature of the fuel cell array for maximum efficiency. The heat from the fuel cell warms the trickle charger 121 and maintains a higher operating temperature on the battery 40. For very cold environments, in addition to the gas diffusion mat, both the battery 40 and the fuel cell provide more insulation to help keep the battery at an elevated temperature from the surroundings. On the other hand, for warm environments the fuel cell may be insulated from the battery and both the battery and fuel cell may have minimal insulation to the exterior of the case. The fuel cavity is designed to have the fuel tank 38 molded in between the cellular phone 31 and the trickle charger 121, as shown. The fuel tank 38 is shaped to fit the tank cavity and may be made from PET polyethylene terephthalate or a similar plastic. The fuel tank 38 is filled with 1:1 molecular ratio of methanol to water mixture from a fuel dispenser 39. A refillable port 41, with a built-in valve that opens for refueling, is located on the side of the trickle charger 121. The valve may be a spring loaded type, such as a tire valve, or a mechanism such as a rubber seal in a basketball where filling is accomplished with a needle through the seal. The act of refueling may be an alternate squeezing and relief action that forces the fuel from the dispenser 39 into the tank 38, while at the same time releasing gas pressure in the tank. The fuel dispenser 39 may have any one of a number of insertion tip features, including, but not limited to:

i) it may seal to the valve on the trickle charger;
ii) it may screw into the trickle charger;
iii) it may twist-lock and seal into the trickle charger; and
iv) in a dual flow manner, it may provide an exit route for gas in the fuel tank as fuel is flowing in.

In refueling, the fuel is wicked from the needle 37 to the MICRO-FUEL CELL fuel manifold. The fuel dispensers 39 may be distributed individually or in blister packages, or they may be refillable through a screw cap from larger bottles of fuel. To allow observation of the fuel level in the fuel tank 38, a transparent window (not shown) is included over the fuel tank and built into the side of the plastic trickle charge refill housing 36. The electric power from the fuel cell is delivered to the charging contacts on the cellular phones through two gold coated beryllium copper contact leaf spring contacts. These contact springs make contact with the MICRO-FUEL CELL through rivet or other electrical connections. The trickle charge refill 121 is designed to be carried as an integral part of the phone. The trickle charger refill 121 may have an outer porous cover to permit moisture from the fuel cell and the user's hand to evaporate. The porous cover enhances the user's grip on the phone and makes it more comfortable to use.

Figure 8A:
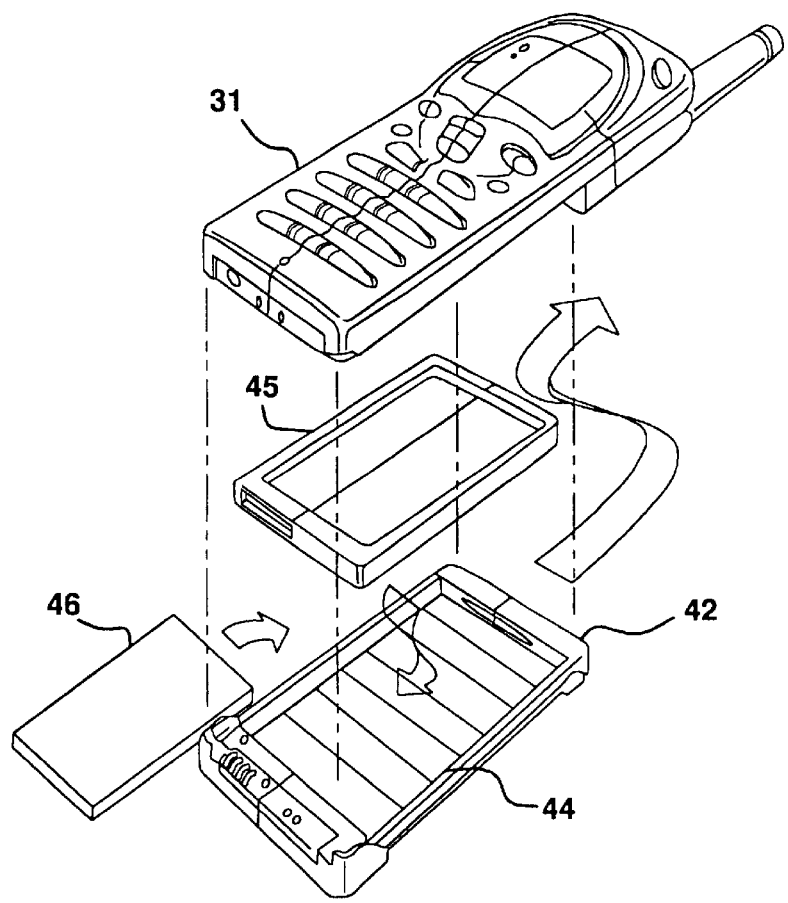
FIGS. 8A and 8B are an exploded view of a cellular phone with a fuel cell and a perspective view of a cellular phone with a fuel cell in place.
Figure 8B:
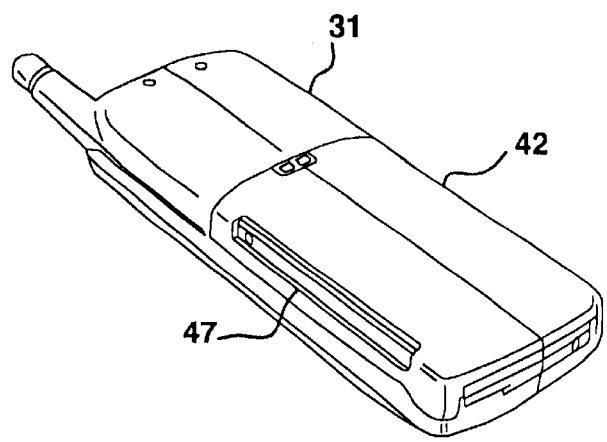

Referring to FIGS. 8A and 8B, the fuel cell only power supply is formed with a polycarbonate plastic module 42 to fit in the position designed for batteries in the cellular phone 31. The fuel cell has four primary components:

i) a fuel cell 44;
ii) a large capacity fuel tank 45;
iii) an insulation and diffusion mat 46; and
iv) voltage regulating electronics (not shown).

The MICRO-FUEL CELL array 44 is placed along the length of the polycarbonate plastic module's housing 42, as shown in FIG. 8A. A gas diffusion mat 46, made from polyester fiber paper to serve as a protective cover, is placed over the MICRO-FUEL CELL array 44. The gas diffusion mat 46 also serves as a thermal insulation layer. In cold environments it may be made thicker and in hot environments it may be made thinner to maintain an optimum elevated operating temperature of the MICRO-FUEL CELL array. The fuel cavity is designed to have fuel tank 45 between the cellular phone 31 and the plastic housing 42, as shown. The fuel tanks 45 are shaped to fit the tank cavity and are made from polyethylene plastic and filled with 1:1 molecular ratio of methanol to water mixture. The fuel tanks are inserted into the fuel cavity and are impaled onto the fueling needle (not shown) to start fueling. The fuel is then wicked from the needle to the MICRO-FUEL CELL fuel manifold. The fuel tanks 45 may be sold individually or packaged in volume quantities. The fuel tanks may also be refilled from a larger container of fuel by means of screw cap. To allow observation of the fuel level, a fuel level indicator window 47 is included in the side of the fuel cell module's plastic housing 42. Electric power from the fuel cell is delivered to the charging contacts on the cellular phone through two gold coated beryllium copper contact leaf spring contacts. These contact springs make contact with the MICRO-FUEL CELL through rivet or other electrical connections.

The fuel-cell-only is designed to be carried as an integral part of the cell phone. The fuel-cell-only may have an outer porous cover to permit moisture from the fuel cell and the user's hand to evaporate. The porous cover enhances the user's grip on the phone and makes it more comfortable to use.

Figure 9:
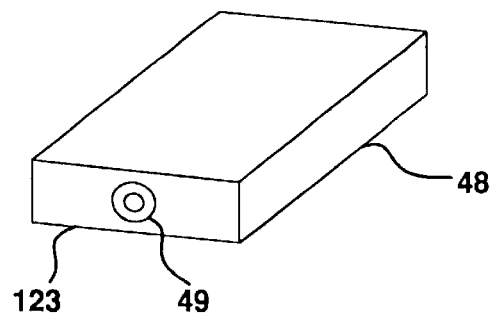
FIG. 9 is a perspective view of a fuel ampoule.

The fuel tanks or ampoules 48 are sealed polyethylene containers filled with a 1:1 molecular mixture of methanol and water, as shown in FIG. 9. The container wall material and properties are chosen to retain the fuel mixture at least five (5) years with less than a 10% loss of fuel. A dimple 49 which may be punctured with a needle is included for fueling the ampoule 48. The surface 123 where the sealing dimple is located needs to be smooth and impermeable enough to permit an o-ring or other type seal to fit tightly around the fueling needle, or mechanism. Other than the dimples, the container may have ridges or protrusions that allow it to fit into the particular fuel cell device and maintain structural integrity to assure a reliable seal with the fueling needle from full to empty. The fuel ampoules 48 may have shapes and forms that allow them to fit snugly and fill the available space in the power supply cavity of a product. The fuel ampoules 48 may be filled with a fuel permeable material that allows the fueling needle to make wicking contact with the fuel regardless as to the orientation of the fuel tank. The tank filler may also have the property that as the fuel is removed from the fuel tank the filler becomes opaque to light or changes color. The fuel tank filler may also act as a flow retardant to minimize fuel leakage in the event of a fuel tank rupture.

Figure 10:
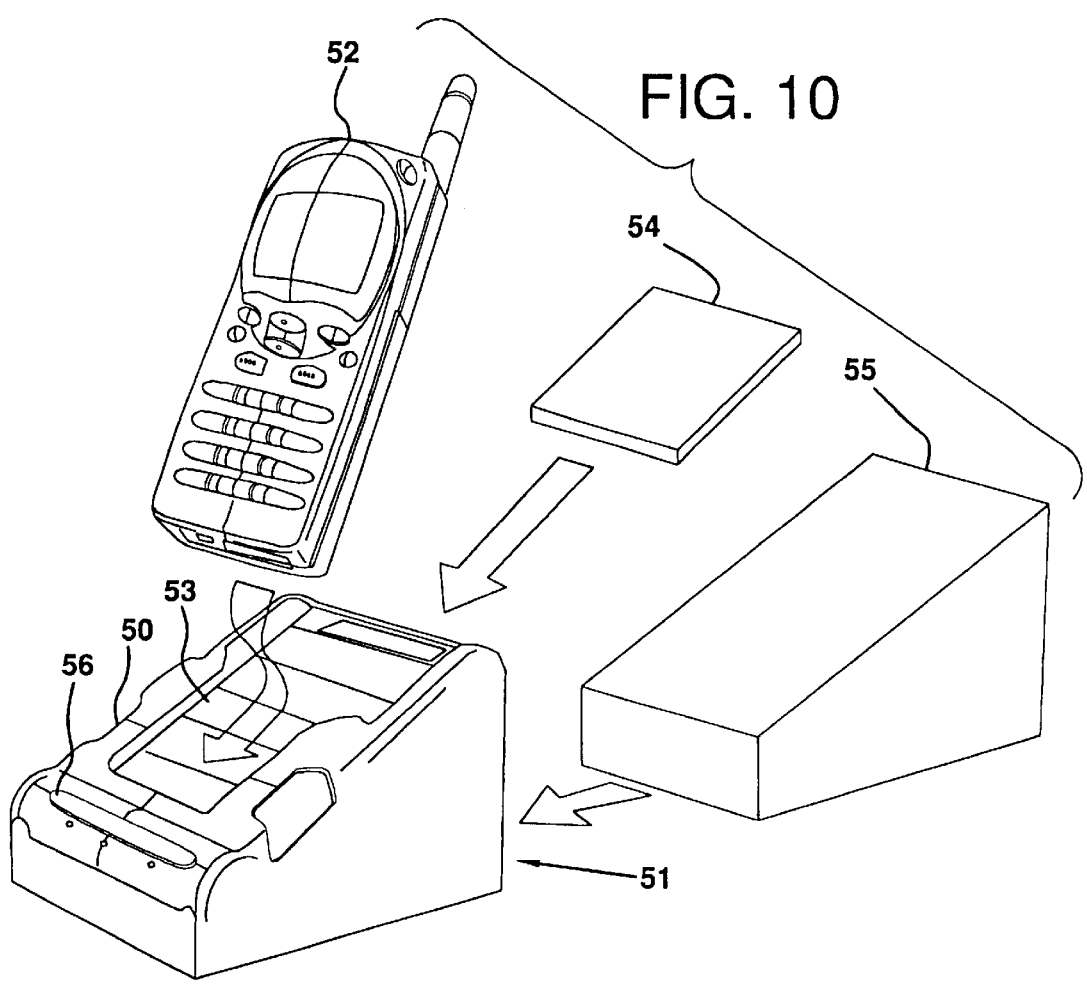
FIG. 10 is an exploded view of a desk power charger.

As shown in FIG. 10, the desk power charger 51 is used to charge the batteries in a cellular phone 52 when the phone is not in use. This desk power charger 51 is formed with polycarbonate plastic or ABS plastic (terpolymer of acrylonitrile, butadiene, and styrene) into a housing 50 that accepts the cellular phone 52 and holds it snugly in place, as shown in FIG. 10. The cellular phone 52 maintains a positive pressure on the electrical contacts in the desk power charger 51 through gravity and/or the vertical mounting of the cellular phone. Alternatives to using gravity pressure is to have the cell phone press against electrical spring contacts and snap-in with a ratchet mechanism, which may be released with a mechanism requiring double pressure on the sides of the charger, or by means of a firm pull on the phone if the ratchet is designed with a slope on both sides of the teeth as discussed earlier with the holster release of FIG. 4A. Velcro, screws, or sticky foam tape may be included on the bottom of the power charger 51 to allow it to be attached to a desk, etc.

The MICRO-FUEL CELL array 53 is placed along the length of the polycarbonate plastic housing 50. A gas diffusion mat 54, made from polyester plastic fiber paper to serve as a protective cover, is placed over the MICRO-FUEL CELL array 53. The gas diffusion mat 54 also serves as a thermal insulation layer. In cold environments it may be made thicker and in hot environments it may be made thinner to maintain an optimum elevated operating temperature of the fuel cell array 53. The desk charger 51 has a large fuel cavity designed underneath to accept the fuel tank (ampoule) 55. The fuel tank 55 is made from polyethylene plastic and filled with 1:1 molecular ratio of methanol to water mixture. As the fuel tank 55 is inserted into the fuel cavity, it is impaled on the fueling needle (not shown) to start fueling. The fuel is then wicked from the needle to the MICRO-FUEL CELL fuel manifold. This larger fuel tank will generally be sold individually or packaged for volume distribution. To allow observation of the fuel level in the fuel tank, a transparent fuel level window 56 is built into the plastic housing 50 of the desk power charger 51.

Electric power from the fuel cell 53 is delivered to the electrical contacts on the cellular phones through two gold coated beryllium copper contact leaf spring contacts. These contact springs make contact with the MICRO-FUEL CELL 53 through rivets or other electrical connections.

Figure 11:
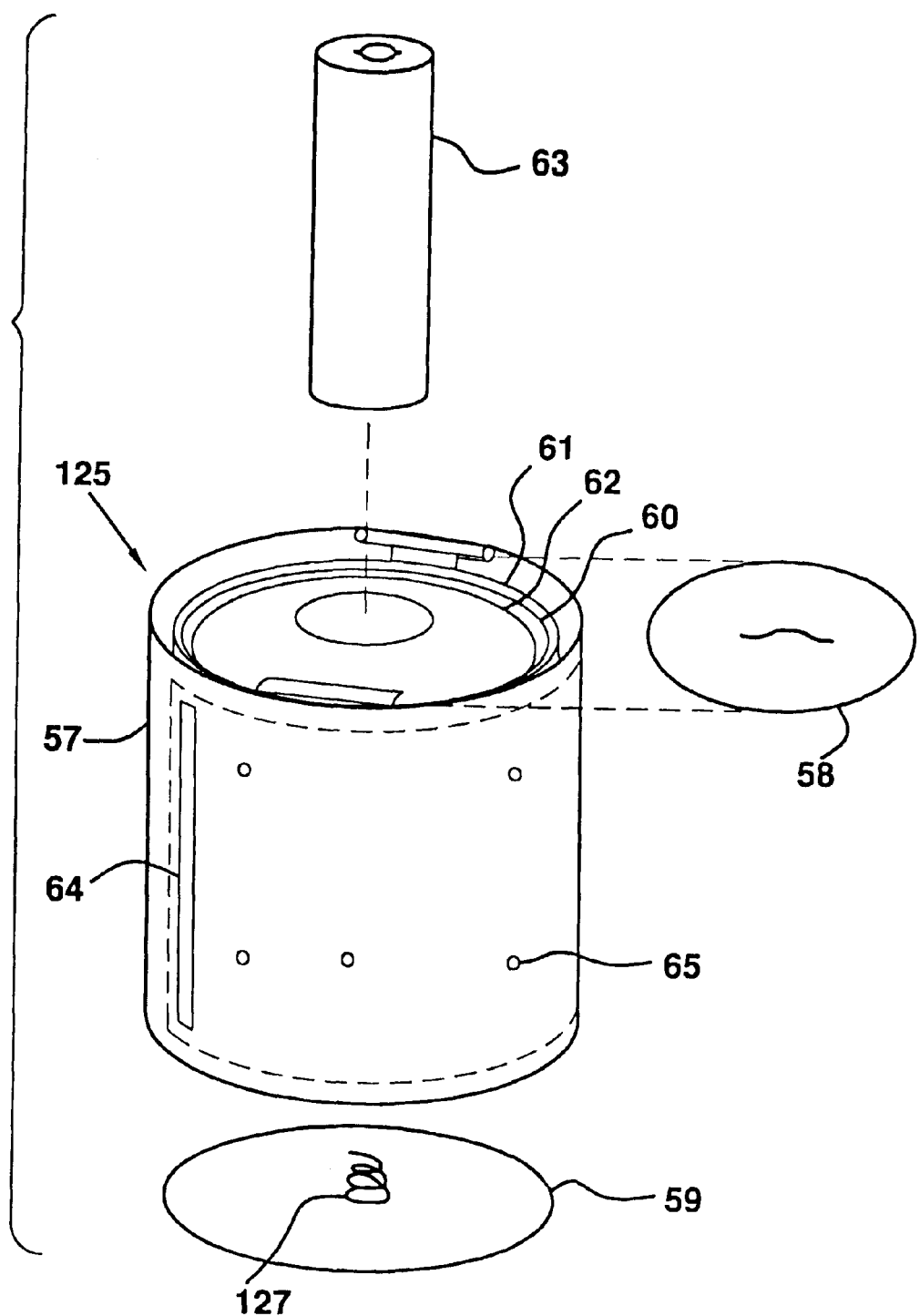
FIG. 11 is an exploded view of a battery charger doughnut.

The battery charger doughnut or ring 125, shown in FIG. 11, is formed with polycarbonate plastic housing 57 to fit snugly with a positive griping hold around a rechargeable battery 63, as shown in FIG. 11. The positive grip on the battery 63 may be accomplished using springy sliding end caps 58 and 59 that also make the electrical connection between the fuel cell 60 and the battery 63. The MICRO-FUEL CELL array 60 is placed along the exterior periphery of the fuel tank 62. A gas diffusion mat 61, made from polyester fiber paper to serve as a protective cover, is placed around the MICRO-FUEL CELL array 60. The gas diffusion mat 61 also serves also a thermal insulation layer. Gas diffusion 61 mats may be placed on both the exterior and interior sides of the MICRO-FUEL CELL array 60. In cold environments it may be made thicker and in hot environments it may be made thinner to maintain an optimum elevated operating temperature of the fuel cell array 60.

The battery charger doughnut 125 has a fuel cavity which is designed to accept a sealed fuel tank 62 in between the gas MICRO-FUEL CELL array 60 with diffusion mat 61 and a standard battery 63. The fuel tanks 62 are shaped to fit the tank cavity of the charger 57 and have a cylindrical hole in the center to accept a standard rechargeable battery 63. The tanks 62 are made from polyethylene plastic and filled with 1:1 molecular ratio of methanol to water mixture. The fuel tanks are inserted into the fuel cavity and are impaled onto the fueling needle (not shown) to start fueling. The fuel tanks 62 are held in the polycarbonate plastic housing 57 by the electrical end caps 58 and 59 and the polycarbonate housing. The fuel is wicked from the needle to the MICRO-FUEL CELL fuel manifold. The fuel tanks may be sold individually or packaged for volume distribution. To allow observation of the fuel level in the fuel tank 62, a viewing slot 64 is built into the battery charger housing 57. The electric power from the fuel cell 60 is delivered to the charging contacts on the battery 63 through two gold coated beryllium copper contact leaf spring contacts 127 located on the upper 58 and lower 59 end caps. These contact springs 127 make contact with the MICRO-FUEL CELL through rivets or other electrical connections. The battery charger ring 125 is designed to have an external profile that matches the battery space available in an electrical application. The outer surface of the battery charger ring 127 is porous with ventilation holes 65 to permit moisture and carbon dioxide from the fuel cell to diffuse out and oxygen to diffuse in. The porous cover can be energy absorbing to enhance the mechanical shock absorbing performance of the power supply in the electrical application.

Figure 12:
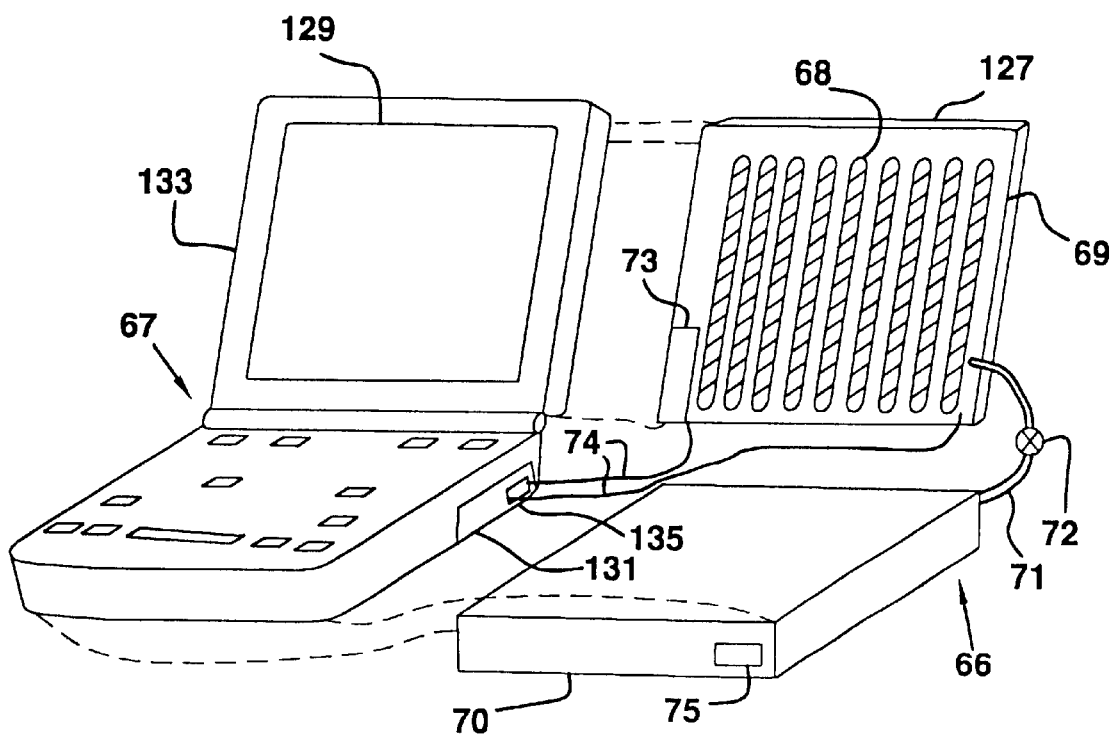
FIG. 12 is an exploded view of a portable computer fuel cell power supply.

A portable computer fuel cell power supply 66 is formed with ABS plastic housing 127 to fit and attach onto the exterior surfaces of a portable computer 67, as shown in FIG. 12. The fuel cell power supply 66 has seven (7) primary components:

i) a fuel cell array 68;
    ii) a diffusion and insulation mat 69;
    iii) a fuel tank 70;
    iv) a fuel tube 71;
    v) a valve 72;
    vi) voltage regulating electronics 73; and
    vii) the electrical cable 74 connection to the portable computer 67.

The fuel cell power supply 66 may also be used to charge a battery 131 located in the portable computer 67. The fuel cell array 68 is placed along the back of the display screen 129 of the personal computer 67 and is protected by the ABS plastic housing 127, as shown. The fuel cell 66 is placed at this location to take advantage of the heat generated by the display screen 129 to elevate the operating temperature of the fuel cell and keep the heat an moisture generated by the fuel cell connected away from the user. A gas diffusion mat 69, made from polyester fiber paper to serve as a protective cover, is placed over the MICRO-FUEL CELL array 68 inside the ABS plastic housing 127. The gas diffusion mat 69 also serves as a thermal insulation layer. In cold environments it may be made thicker and in hot environments it may made be thinner to maintain an optimum elevated operating temperature of the MICRO-FUEL CELL array 68.

The fuel cavity is designed to have the fuel tank 70 underneath the portable computer, as shown in FIG. 12. The fuel tank 70 may be protected by an ABS plastic cover, or it may be made robust enough that a cover is not needed. This places the majority of the mass of the fuel cell power supply 66 as low as possible on the portable computer 67 to maintain a low center of gravity. The fuel tank 70 also provides good thermal conductivity to dissipate heat generated by the computer. The fuel tank 70, which is shaped to fit and grip the underside of the portable computer, is made from polyethylene plastic or polycarbonate plastic and filled with 1:1 molecular ratio of methanol to water mixture. The fuel tank 70 is made to be snapped to the underside of the portable computer 67 or to attach with other possible attachment mechanisms, such as Velcro, foam tape, slide-on, or screws. Fuel tanks 70 may be sold individually for replacement or may be refilled from a larger container of fuel. New fuel tanks 70 may have a membrane seal to ensure that no fuel leaks through the coupling before use.

Fueling is done by connecting the fuel tube 71 to the fuel tank 70. This fitting may be a screw on to a valve stem, a "quick connect", or a fuel needle insert type similar to a basketball rubber seal that seals on the shaft of the needle. The fuel is wicked, flowed or pumped from the needle or fuel connection to the MICRO-FUEL CELL fuel manifold. To allow observation of the fuel level in the fuel tank 70, a clear window 75 is built into the plastic housing 127. If a porous filler is used in the fuel tank, a change in the filler from transparent to opaque may be used to indicate the fuel level in the fuel tank. A dimpled area of the fuel tank 70 may be provided to pump the fuel to the fuel tube by alternately compressing and relieving pressure on the dimple. Since the portable computer power supply 66 is expected to run for periods of many hours before being shut down, a valve 72, which is connected to the fuel tube 71, is provided to shut off the fuel cell and save fuel from diffusion leakage through the fuel cell array 68. The fuel valve 72 may be opened and closed when the screen 133 of the computer 67 is opened and closed. The valve 72 may include capillaries to allow the fuel to wick through the valve. In another embodiment, the fuel tube 71 is made out of a rubber or plastic such that when the display screen 133 is opened or shut, the capillaries are squeezed on and off, respectively. If one-way valves are used, simple pumping of the fuel may be achieved by opening and closing the display screen 133, or possibly by simply squeezing the fuel tube 71. The electric power from the fuel cell is delivered through voltage regulating circuitry 73 which is located next to the fuel cell array 68 or in the conventional battery cavity of the portable computer 67. Current flows from the fuel cell array 68 to the battery input connection 135 on the portable computer 67 through an electric cable 74. If a rechargeable battery is used, the electrical input may be at the common connection of the battery and the portable computer. The contact with the MICRO-FUEL CELL 68 can be made with rivet or other electrical connections. The fuel cell power supply 66 is carried as an integral part of the portable computer 67. It may have an outer porous cover to permit moisture from the fuel cell and the user's body to evaporate. The porous cover enhances the user's grip on the portable computer and makes it more comfortable to use.

Figure 13:
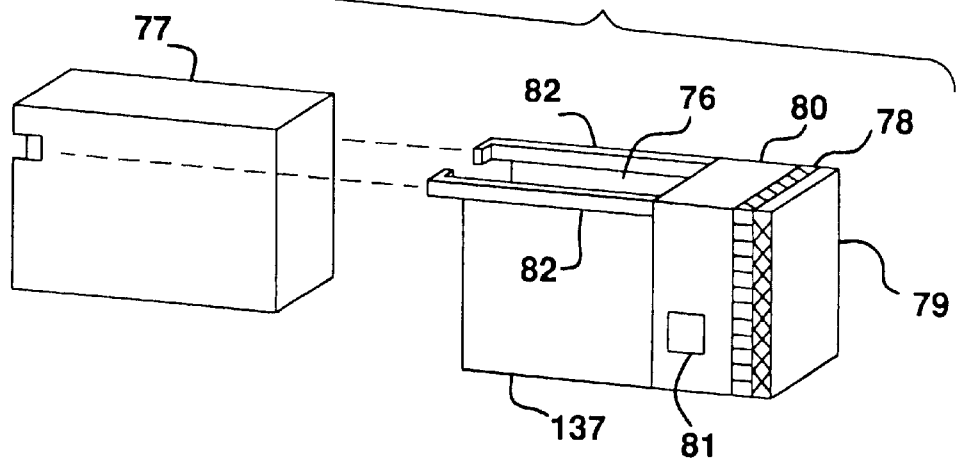
FIG. 13 is an exploded view of a portable camcorder piggyback fuel-cell power supply.

The fuel cell power supply 76 is formed with ABS plastic housing 137 to fit and attach onto the exterior surfaces of a video camcorder or portable power tool battery 77, as shown in FIG. 13. The fuel cell output is electrically connected in parallel to the rechargeable battery located in the camcorder or tool. The battery 77 may be a lead acid, nickel metal hydride or a lithium ion battery. With all those batteries, voltage regulation of the output may be used. For a lithium ion battery, the voltage regulation and charging circuit may automatically regulate the charging. The video camcorder or portable power tools are used for short periods of time, and then are idled for a period of time that ranges from hours to days. Thus, the fuel cell 76 trickle charges the battery 77 during the idle periods. The fuel cell array 78 is snapped along the back of the tool's battery 77, or surrounds a smaller than usual battery, to allow this hybrid power supply to fit the docking cavity or arrangement on the video camcorder or portable power tool. The housing 137 of this hybrid power supply is made of ABS plastic. The fuel cell 76 is placed at this location to release the heat and moisture generated by the fuel cell 76 away from the video camcorder or portable power tool. A gas diffusion mat 79, made from polyester fiber paper to serve as a protective cover, is placed over the MICRO-FUEL CELL array 78 inside the ABS plastic housing 137. The gas diffusion mat 79 also serves as a thermal insulation layer. In cold environments it may be made thicker and in hot environments it may be made thinner to maintain an optimum elevated operating temperature of the fuel cell array 78. The fuel tank 80 is shaped to fit inside the power supply between the battery 77 and the diffusion mat 79. The fuel tank 80 is made from polyethylene plastic or polycarbonate plastic and filled with 1:1 molecular ratio of methanol to water mixture.

Fueling may be accomplished by snapping open the fuel cell power supply 76 from the battery 77, inserting the fuel tank 80, and closing the power supply assembly back over the battery. The fuel tank 80 is punctured by a fueling needle as the cover slides over the battery or could have screw on caps and screw onto the fuel cell. The fuel is then wicked from the needle or fuel connection to the fuel cell fuel manifold. The fuel tanks 80 may be sold individually or refilled by the user from a larger container of fuel. The fuel tanks 80 may also have a membrane seal to insure no fuel leakage through the coupling before use.

To allow observation of the fuel level in the fuel tank 80, the tank could be made clear with a window 81 in the plastic housing 137 for viewing. If a porous filler is used in the fuel tank, the change from transparent to opaque may also be the indicator of fuel quantity in the fuel tank 80. Electric power from the fuel cell is delivered through voltage regulating circuitry (not shown). Current flows from the fuel cell array 78 to the video camcorder or portable power tool through two sheet metal contact strips 82, or by other electrical means, that form the common connection between the battery and video camcorder/power tool. Electrical contact with the MICRO-FUEL CELL 78 is made through rivets or other electrical connections. The fuel cell to portable video camcorder or power tool power supply is carried as an integral part of the appliance. It may have an outer porous cover to permit moisture from the fuel cell and the user's body to evaporate. The porous cover enhances the user's grip on the appliance and makes it more comfortable to use.

Figure 14:
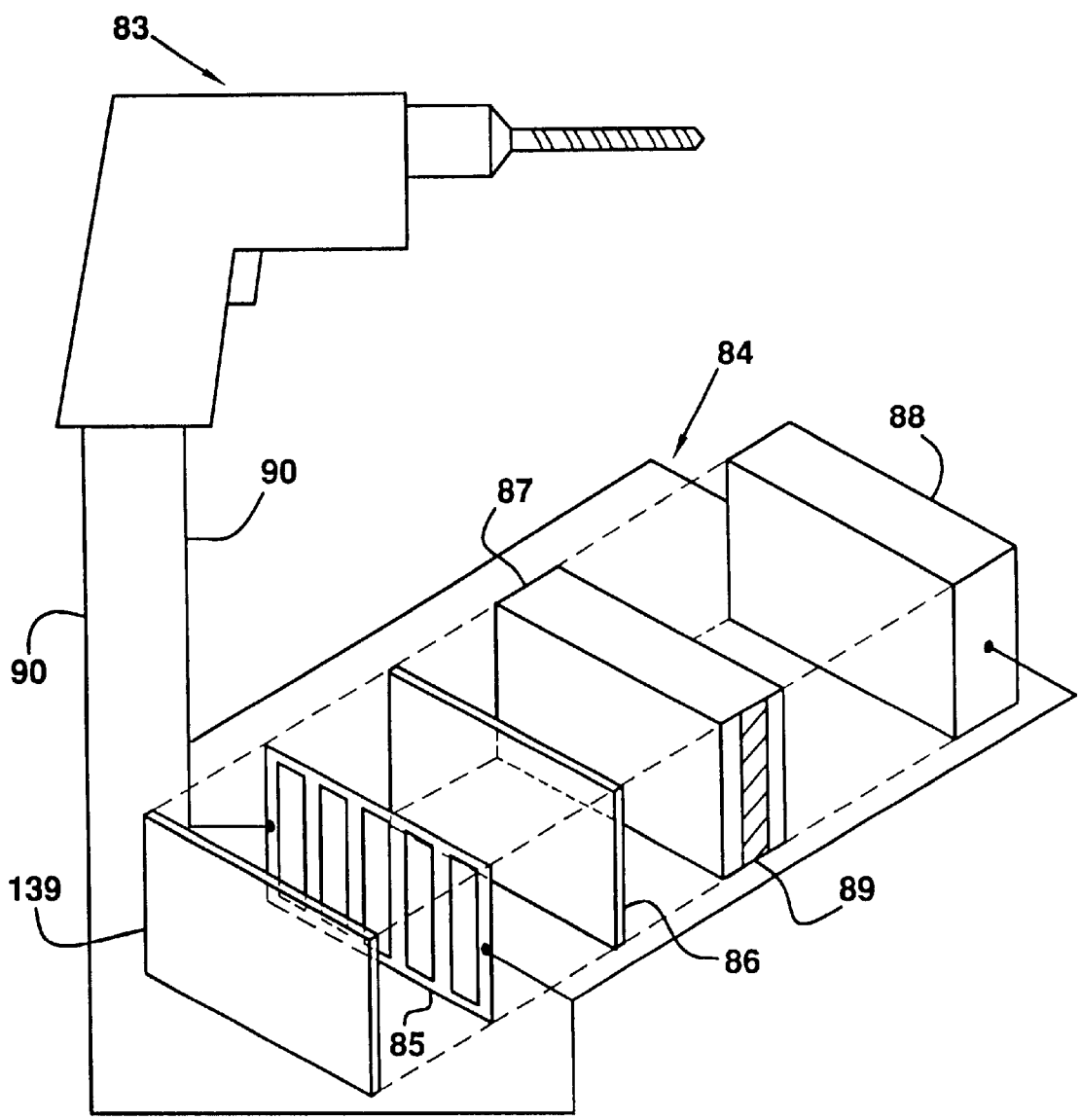
FIG. 14 is an exploded view of an external fuel-cell power supply for a portable battery-powered device.

A substitute for a piggy back charging scheme for video camcorders and portable power tools 83 is the separate fuel cell power supply 84, which is connected to the camcorder or tool through an electrical power cord, as illustrated in FIG. 14. This permits a wide range of devices to be powered by the fuel cell 84, lightens the weight of the tool 83, and dissipates the heat of the fuel cell 84 away from the appliance 83. The fuel cell 84 may be carried as a strap-on or a clip-on by the user. The fuel cell output is electrically connected in parallel to the rechargeable battery 88, or is voltage regulated through electronics. The battery 88 may be a lead acid battery, nickel metal hydride or a lithium ion battery. With all of these battery chargings, voltage regulation of the output may be used. Especially if a lithium ion battery is used, the voltage regulation and charging circuit may regulate the charging. The video camcorder or portable power tools 83 are to run for short periods of time, and then are idled for hours to days. Thus, the fuel cell 84 trickle charges the battery during the idle periods. The housing of this power supply is made of ABS plastic. The fuel cell array 85 is placed at the outer surface to permit the intake of oxygen and the release of carbon dioxide, heat, and moisture generated by the fuel cell 84. Gas diffusion mats 86 and 139, made from polyester fiber paper to serve as a protective covers, are placed around the fuel cell array 85 inside the ABS plastic housing. The gas diffusion mats 86 and 139 also serve as a thermal insulation layer. In cold environments it may be thickened, and in hot environments it may be thinned to maintain an optimum elevated operating temperature of the fuel cell array 85. The fuel tank 87 is shaped to fit inside the power supply assembly between the battery 88 and the inner diffusion mat 86. The outer diffusion mat 139 may be removed or changed. The fuel tanks 87 are made from polyethylene plastic or polycarbonate plastic and filled with 1:1 molecular ratio of methanol to water mixture. Fueling is done by snapping open the fuel cell from the assembly, inserting the fuel tank, and closing the fuel cell back over the assembly. The fuel tank is punctured on a fueling needle as the cover closes over the assembly. The fuel is then wicked, from the needle or fuel connection to the fuel cell fuel manifold. These large fuel tanks 87, which have a membrane seal to insure no fuel leakage through the coupling before use, may be sold individually or may be refilled by the user from a larger container of fuel. An alternative to the membrane seal might be to have a removable screw on cap that may be removed for attaching the fuel tank 87 to the fuel cell 85. To allow observation of the fuel quantity in the fuel tank 87, a clear window 89 or opening is provided to allow the fuel level to be viewed. If a porous filler is used in the fuel tank, the change from transparent to opaque indicates the fuel quantity in the fuel tank 87. Electric power from the fuel cell is delivered through a voltage regulating circuit next to the fuel cell. The current flows from the fuel cell array 85 to the video camcorder or portable power tool 83 through the electrical cable 90. The electrical contact with the fuel cell is made through rivets or other electrical connections.

The fuel cell to portable video recorder, or power tool power supply, is carried separate from the appliance. It may have an outer porous cover to permit moisture from the fuel cell and the user's body to evaporate. The porous cover enhances the user's grip on the power supply and makes it more comfortable to use.

While this invention has been described in the context of a series of preferred embodiments, it will be apparent to those skilled in the art that the present invention may be modified in numerous ways and may assume many embodiments other than those specifically set out and described above. Accordingly, it is intended by the appended claims to cover all modifications of the invention which fall within the true spirit and scope of this invention.

We claim:

1. An apparatus having a power source for a battery powered device comprising an energy source, a fuel cell array consisting of at least one rechargeable fuel cell array sub-assembly having a plastic web comprising a patterned porous plastic substrate, electrolyte coating on the substrate, diffusion membrane, and gas manifolds for receiving fuel from the energy source and converting to power supply for the device, a thermal insulation and gas diffusion mat positioned on the fuel cell array, the gas diffusion mat having a water distribution matrix for removing and/or supplying water to the fuel cell array, and fuel manifolds in the fuel cell array, and a holder for receiving the battery powered device, the energy source, the thermal insulation and gas diffusion mat, and the fuel cell array.

2. The apparatus of claim 1, wherein the holder is of a plastic material.

3. The apparatus of claim 1, wherein the energy source is a fuel tank.

4. The apparatus of claim 3, wherein the fuel tank contains fuel that has a 1:1 molecular ratio of methanol to water.

5. The apparatus of claim 3, wherein the fuel tank is replaceable.

6. The apparatus of claim 3, further comprising a cavity in the holder for receiving the fuel tank.

7. The apparatus of claim 3, further comprising a fuel level indicator window in the holder for viewing the level of fuel in the fuel tank.

8. The apparatus of claim 1, further comprising a location in the holder for locating the portable battery charger and battery powered device.

9. The apparatus of claim 1, further comprising power connecting electronics in the holder.

10. The apparatus of claim 1, further comprising a clip on the holder for attaching the holder to a user's clothing.

11. The apparatus of claim 1, further comprising a rachet mechanism for releasably securing the battery powered device to the holder.

12. The apparatus of claim 1, wherein the diffusion mat has a thickness that varies across the fuel cell array.

13. The apparatus of claim 1, further comprising a cover for covering the holder.

14. The apparatus of claim 1, wherein the fuel cell array is a surface replica fuel cell power source.

15. The apparatus of claim 5, further comprising a package having a plurality of fuel tanks for replacing spent fuel tanks.

16. The apparatus of claim 3, wherein the fuel tank contains fuel having a hydrogen bearing compound.

17. The apparatus of claim 16, wherein the fuel is selected from a group consisting of alcohol and hydrocarbon bearing compounds.

18. A portable fuel cell power supply apparatus comprising an energy source, a fuel cell array consisting of at least one rechargeable fuel cell array sub-assembly having a plastic web comprising a patterned porous plastic substrate, electrolyte coating on the substrate, diffusion membrane, and gas manifolds for receiving fuel from the energy source, a thermal insulation and gas diffusion mat positioned on the fuel cell array, the gas diffusion mat having a water distribution matrix for removing and/or supplying water to the fuel cell array, a battery for receiving a continuous charge from the fuel cell array, and a holder for receiving the energy source, the fuel cell array, the diffusion mat and the battery.

19. The apparatus of claim 18, wherein the energy source is a fuel tank.

20. The apparatus of claim 19, wherein the fuel tank contains fuel that has a 1:1 molecular ratio of methanol to water.

21. The apparatus of claim 19, wherein the fuel tank is refillable.

22. The apparatus of claim 18, wherein the holder fits into the battery cavity of a cellular phone.

23. The apparatus of claim 18, wherein the holder is of a plastic material.

24. The apparatus of claim 19, further comprising a cavity in the holder for receiving the fuel tank.

25. The apparatus of claim 19, further comprising a fuel level indicator window in the holder for viewing the level of fuel in the fuel tank.

26. The apparatus of claim 18, wherein the diffusion mat has a thickness that varies across the fuel cell array.

27. The apparatus of claim 18, further comprising a cover for covering the holder.

28. The apparatus of claim 21, further comprising a refill port in the holder for adding fuel to the fuel tank.

29. The apparatus of claim 28, further comprising a fuel dispenser for adding fuel to the fuel tank through the refill port.

30. The apparatus of claim 18, wherein the fuel cell array is a surface replica fuel cell power source.

31. The apparatus of claim 21, wherein the fuel tank is replaceable.

32. The apparatus of claim 31, further comprising a kit having a plurality of fuel tanks for replacing spent fuel tanks.

* * * * *

UNITED STATES PATENT AND TRADEMARK OFFICE
CERTIFICATE OF CORRECTION

PATENT NO. : 6,326,097 B1
DATED : December 4, 2001
INVENTOR(S) : Robert G. Hockaday, Patrick S. Turner, Marvin Maslow and Martin Cooper It is certified that error appears in the above-identified patent and that said Letters Patent is hereby corrected as shown below:

<u>Title page,</u>
Item [75], add the following inventors:

Patrick S. Turner, Los Alamos, NM (US)
Marvin Maslow, New York, NY (US)
Martin Cooper, Del Mar, CA (US)

Signed and Sealed this

Sixteenth Day of April, 2002

*Attest:*

JAMES E. ROGAN
*Attesting Officer*     *Director of the United States Patent and Trademark Office*